US007640301B2

(12) United States Patent
Walter

(10) Patent No.: US 7,640,301 B2
(45) Date of Patent: Dec. 29, 2009

(54) SYSTEM AND METHOD FOR DISTRIBUTING VIDEO CONFERENCE DATA OVER AN INTERNET PROTOCOL TELEVISION SYSTEM

(75) Inventor: Edward A. Walter, Boerne, TX (US)

(73) Assignee: ATT Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 11/399,048

(22) Filed: Apr. 6, 2006

(65) Prior Publication Data

US 2007/0239825 A1    Oct. 11, 2007

(51) Int. Cl.
    G06F 15/16    (2006.01)
(52) U.S. Cl. ...................................... 709/204
(58) Field of Classification Search .......... 709/203, 709/204, 219; 725/86, 87, 110; 348/14.08
    See application file for complete search history.

(56) References Cited

U.S. PATENT DOCUMENTS

| | | | |
|---|---|---|---|
| 5,826,270 A * | 10/1998 | Rutkowski et al. ............. | 707/10 |
| 5,867,494 A | 2/1999 | Krishnaswamy et al. | |
| 6,989,856 B2 | 1/2006 | Firestone et al. | |
| 2002/0033880 A1 | 3/2002 | Sul et al. | |
| 2002/0042832 A1 | 4/2002 | Fallentine et al. | |
| 2002/0118809 A1 | 8/2002 | Eisenberg | |
| 2004/0071098 A1 | 4/2004 | Magnuski | |
| 2004/0119814 A1 | 6/2004 | Clisham et al. | |
| 2004/0145650 A1 | 7/2004 | Jarboe et al. | |
| 2005/0073964 A1 | 4/2005 | Schmidt et al. | |
| 2005/0111388 A1 | 5/2005 | Kim | |
| 2005/0144233 A1 | 6/2005 | Kjesbu et al. | |
| 2005/0197877 A1 | 9/2005 | Kalinoski | |
| 2005/0243810 A1 | 11/2005 | Nose | |
| 2005/0283813 A1 * | 12/2005 | Jamail et al. ................. | 725/109 |
| 2006/0015928 A1 * | 1/2006 | Setty et al. ................... | 725/148 |
| 2006/0047750 A1 * | 3/2006 | Schmitt et al. ............... | 709/204 |
| 2006/0244818 A1 * | 11/2006 | Majors et al. ............ | 348/14.08 |
| 2007/0058629 A1 * | 3/2007 | Luft ........................... | 370/390 |
| 2007/0143817 A1 * | 6/2007 | Conradt et al. ............... | 725/135 |

* cited by examiner

*Primary Examiner*—Andrew Caldwell
*Assistant Examiner*—Jason Recek
(74) *Attorney, Agent, or Firm*—G. Michael Roebuck

(57) ABSTRACT

A computerized system and method for distributing video conference data over an internet protocol television (IPTV) system are disclosed including structures and methods for allocating an IPTV video conference channel to groups of video conference participants' set top boxes (STBs), accessing STB data at the server indicating a group of video conference participants' STBs in the groups of video conference participants' STBs, the group of STBs being associated with one video conference data, mapping at the server, the video conference channel to the group of video conference participants' STBs and to one IP address for the one of the video conferences data, and delivering from the server over the video conference channel from a first one of the of IP addresses, the first one of the video conferences data to the first group of video conference participants' STBs.

23 Claims, 13 Drawing Sheets

SYSTEM AND METHOD FOR DISTRIBUTING VIDEO CONFERENCE DATA OVER AN INTERNET PROTOCOL TELEVISION SYSTEM

BACKGROUND OF THE DISCLOSURE

1. Field of the Illustrative Embodiment

The disclosure relates to the field of video conferencing.

2. Description of the Related Art

As teleworking (working from home or from a location distant from a central company office) is an option to which more companies are turning, service creation that supports enhanced communication from a corporation to home-based employees is becoming more in demand. In the past, many teleworkers or remote users were limited to phone conferences and emails. Other options also included integrated services digital network (ISDN) for higher bandwidth delivery of video, voice, and data connectivity between a corporation and its teleworkers.

BRIEF DESCRIPTION OF THE DRAWINGS

For a detailed understanding of the illustrative embodiment, references should be made to the following detailed description of an illustrative embodiment, taken in conjunction with the accompanying drawings, in which like elements have been given like numerals.

DETAILED DESCRIPTION OF AN ILLUSTRATIVE EMBODIMENT

Figure 1:
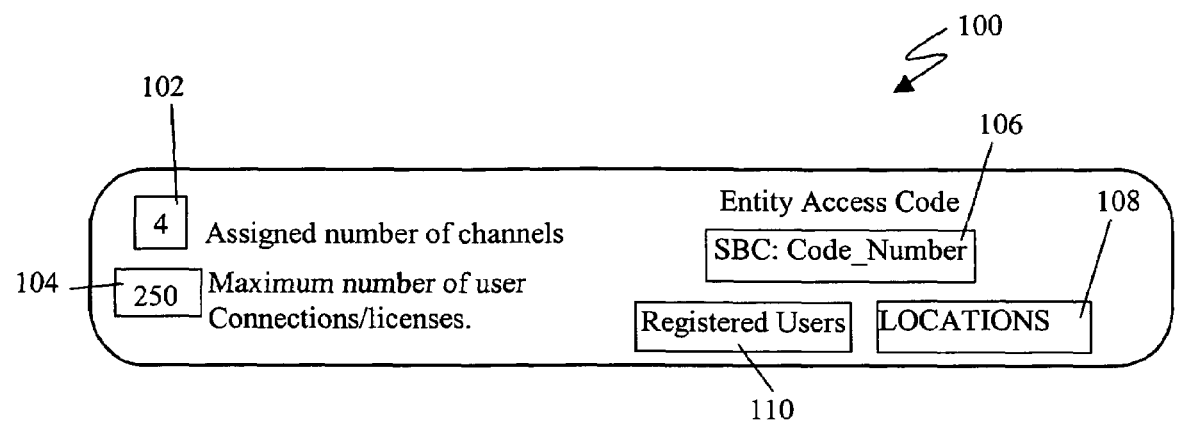
FIG. 1 is a schematic diagram depicting an illustrative embodiment showing a graphical user interface for selecting video conferencing services.

In view of the above, an illustrative embodiment is presented through one or more of its various aspects to provide one or more advantages, such as those noted below. In one embodiment a method is presented for configuring a video conference system.

In an illustrative embodiment a method is disclosed for distributing video conference data including allocating at a server in the IPTV system, an IPTV video conference channel to a plurality of groups of video conference participants' set top boxes (STBs), accessing first STB data at the server indicating a first group of video conference participants' STBs in the plurality of groups of video conference participants' STBs, the first group of STBs being associated with a first one of a plurality of video conferences data, mapping at the server, the video conference channel to the first group of video conference participants' STBs and to a first one of a plurality of IP addresses for the first one of the plurality of video conferences data, and delivering from the server over the video conference channel from a first one of the plurality of IP addresses, the first one of the plurality of video conferences data to the first group of video conference participants' STBs.

In another aspect of a particular embodiment the method further includes allocating the video conference channel further includes mapping at the server, the video conference channel to a second group of video conference participants' STBs and to a second one of the plurality of IP addresses for a second one of the plurality of video conferences data, and delivering from the server over the video conference channel from a second one of the plurality of IP addresses, the second one of the plurality of video conferences data to the second group of video conference participants' STBs.

In another aspect of a particular embodiment the method further includes inserting the video conference into the IPTV system at a server lowest in a server hierarchy and that sends data to each of the STBs in first group of video conference participants' STBs.

In another aspect of a particular embodiment the server lowest in the server hierarchy is selected from a group consisting of a super head end office, regional office, local office and metro office.

In another aspect of a particular embodiment the method further includes duplicating the first audio data from the first video conference data and sending the duplicated first audio data to a video conference participant device after video conference participant has left an STB associated with the video conference.

In another particular embodiment a computer readable medium is disclosed containing instructions that when executed by a computer perform a method for video conference. The method includes allocating at a server in the IPTV system, an IPTV video conference channel to a plurality of groups of video conference participants' set top boxes (STBs), accessing first STB data at the server indicating a first group of video conference participants' STBs, the first group of STBs being associated with a first one of a plurality of video conferences data, mapping at the server, the video conference channel to the first group of video conference participants' STBs and to a first one of a plurality of IP addresses for the first one of the plurality of video conference data, and delivering from the server over the video conference channel from a first one of the plurality of IP addresses, the first one of the plurality of video conferences data to the first group of video conference participants' STBs.

In another aspect of a particular embodiment the method allocating the video conference channel further includes mapping at the server, the video conference channel to a second group of video conference participants' STBs and to a second one of the plurality of IP address for a second one of the plurality of video conferences data, and delivering from the server over the video conference channel from a second one of the plurality of IP addresses, the second one of the plurality of video conferences data system to the second group of video conference participants' STBs.

In another aspect of a particular embodiment the method further includes inserting the video conference data into the IPTV system at a server lowest in a server hierarchy and that sends data to each of the STBs in first group of video conference participants' STBs.

In another aspect of a particular embodiment the method further includes wherein the server lowest in the server is selected from a group consisting of a super head end office, regional office, local office and metro office.

In another aspect of a particular embodiment wherein in the first video conference data further includes first audio data, the method further includes duplicating the first audio data for the video conference and sending the duplicated first audio data to a participant who has left the video conference.

In another particular embodiment a video conference system is disclosed that includes a memory containing a group of video conference participants, a processor coupled to the memory, and a computer program stored in the memory. The computer program includes instructions to access first STB data at the server indicating a first group of video conference participants' STBs in the plurality of groups of video conference participants' STBs, the first group of STBs being associated with a first one of a plurality of video conference data, instructions to map at the server, the video conference channel to the first group of video conference participants' STBs and to a first one of a plurality of IP addresses for the first one of the plurality of video conferences data and instructions to deliver from the server over the video conference channel from a first one of the plurality of IP addresses, the first one of the plurality of video conferences data to the first group of video conference participants' STBs.

In another aspect of a particular embodiment the computer program further includes instructions to map at the server, the video conference channel to a second group of video conference participants' STBS and to a second one of the plurality of IP addresses for a second one of the plurality of video conferences data and instructions to deliver from the server over the video conference channel from a second one of the plurality of IP addresses, the second one of the plurality of video conferences data to the second group of video conference participants' STBs.

In another aspect of a particular embodiment the computer program further includes instructions to insert the video conference data into the IPTV system at a server lowest in a server hierarchy and that sends data to each of the STBs in first group of video conference participants' STBs.

In another aspect of a particular embodiment the server lowest in the server hierarchy is selected from a group consisting of a super head end office, regional office, local office and metro office.

In another aspect of a particular embodiment wherein the video data further includes a first audio data, the computer program further includes instructions to duplicate the first audio data for the video conference data and instructions to send the duplicated first audio data to a participant who has left an STB receiving the first video conference data.

In another embodiment a data structure is disclosed including a group identifier field for containing data identifying a group of internet protocol television (IPTV) network video conference participants, a video conference data address field for containing data identifying an internet protocol (IP) address for video conference data for delivery of the video conference data to video conference participants' STBs over an IPTV channel in the IPTV system and a STB identifier field for containing data identifying the STBs with the group of video conference participants for mapping a video conference channel to the video conference data address field and the STBs.

In another embodiment the data structure further includes a channel identifier field for containing data identifying the video conference channel in an IPTV network for distributing the video conference data to the video conference participants' STBs.

In another embodiment a set of application program interfaces is disclosed embodied on a computer readable medium for execution on a computer in conjunction with an application program that distributes video conference video data over an IPTV video channel to a group of video participants' STBs, the set of application program interfaces including a first interface that receives a group identifier data identifying a first group of video conference participants' STBs, a second interface that receives data representing a first video conference data internet protocol (IP) address identifying an IP address for the first video conference data for delivery of the first video conference data to the first video conference participants' STBs over an IPTV video conference channel and a third interface that receive STB identifier data for identifying a plurality of STB identifiers associated with the first group of video conference participants' STBs for mapping the IPTV channel to the first video conference data IP address for delivery of the first video conference data to the first group of video conference participants' STBs.

In another embodiment, the set of application program interfaces further includes a fourth interface that receives a channel identifier data identifying the channel in an IPTV network for distributing first video conference data to the first group of video conference participants' STBs.

In another embodiment, a computerized method for distributing video conference data in an IPTV system includes sending from a first client device to a server, data indicating a first list designating a first group of video conference participants' set top boxes (STBs); and sending from the client device to the server, a first video conference data, the first video conference data to be sent from the server over a video conference channel in the IPTV system to first group of video conference participants' STBs.

In another aspect of a particular embodiment, the method further includes sending from a second client device to a server, a second group of video conference participants' STBs to the server, and sending a second conference video data to the server, the second video conference data to be sent from the server to the second group of video conference participants' STBs over the video conference channel.

In another aspect of a particular embodiment the first and second client device are the same device.

In another embodiment a set of graphical user interfaces is disclosed embodied on a computer readable medium for execution on a computer in conjunction with an application program that distributes video conference data over an IPTV video conference channel to a group of video participants'

STBs, the set of graphical user interfaces including a first interface that receives a first group identifier data identifying one of plurality of groups of video conference participants' STBs, a second interface that receives data representing a first video conference internet protocol (IP) address identifying an address for delivery of the first video conference data to the first group of video conference participants' STBs over the IPTV video conference channel and a third interface that maps the IPTV video conference channel to the first video conference data address field for delivery of the first video conference data to the first group video conference participants' STBs.

In another embodiment, the set of graphical user interfaces further includes a fourth interface that receives data representing a second video conference internet protocol (IP) address identifying an address for delivery of the second video conference data to the second group of video conference participants' STBs over the IPTV channel and a fifth interface that maps the video conference channel to the second video conference address for delivery of the second video conference data to the second group of video conference participants' STBs.

The illustrative embodiment provides an ordering and provisioning method and system for corporations to administer video conferences across a public or private IPTV network for the purpose of audio and video data distribution to remote users of the IPTV system. This illustrative embodiment not only enhances the IPTV product for consumers but also provides a system for resell to the corporate market. In addition, the product set creates a "sticky" product allowing the "consumer" (remote teleworker) and "enterprise" to leverage an IPTV system.

The illustrative embodiment targets enhancement of the IPTV system for services that can be offered to the consumer who is also a mobile (at-home) worker (teleworker) to the enterprise or corporation at which this consumer is employed. As the costs of travel continue to climb and companies try to find new ways to curb expenses, the ability to meet and collaborate via video and/or voice conferencing are growing.

A system and method for providing an integrated video conference service is disclosed herein. A method and system are provided for the enterprise or corporate customer to easily schedule and configure video conference appointments.

A web portal or graphical user interface (GUI) is provided in an illustrative embodiment for presenting menus to a user, such as an enterprise administrator or multiple users with appropriate authenticated access identifiers who are able to configure or select the time, video conference participants, origin and location of a video conference. In addition, the portal provides the ability to assign video conference participants' or attendees. In a particular embodiment, the displayed available IPTV users are selected from a list of those IPTV users that associate themselves with the enterprise and allow for their name/contact information to be displayed. In addition, when selecting the option to "Allow" video conferencing from "Entity XXX" the consumer also identifies the method of notification of the video conference to invited attendees (i.e. email, voice alert via phone, etc.) Thus, for the video conference transaction to occur the consumer (teleworker or at-home worker, i.e., video conference participant) allows for distribution of the video conference data to their STB. However, once the consumer selects the option to allow for the videoconference and selects the Enterprise, video can be offered until the consumer de-selects the option. In an illustrative embodiment, the video is distributed one-way, that is from the enterprise through the IPTV system to the STB and audio is distributed two-way so that video conference participants can communicate with each other via audio. In another embodiment video and audio is two-way so that video conference participants can communicate with each other via video and audio.

Turning now to FIG. 1, FIG. 1 is a schematic 100 diagram showing a graphical user interface (GUI) providing a level of service and access to select or configure which users will be given access to the IPTV video conference data and the locations within the corporation that can provide this video conference data. The GUI format and data is stored in a memory accessible to the processor. Each server in the IPTV network (shown below in FIG. 11) and the application processor includes a processor 130, memory 132 coupled to the processor and a database 134. A computer program including instruction for execution by the processor may be stored in the memory 132. The assigned number of channels available to the enterprise are determined and configured by an IPTV Service Provider (SP) at 102 who controls the IPTV network. In an illustrative embodiment, a single IPTV video conference channel if provided, i.e., channel 100. Each video conference data multicast over the video conference channel as a separate multicast. Each separate multicast is mapped to a particular group of STBs which receive a particular multicast of video conference data over the video conference channel. The assigned number of channels is the number of simultaneous video feeds that will be supported by the IPTV service provider from the enterprise (corporate video feed) by the IPTV network. The number of user connections configured by an IPTV service provide (SP) is determined by the number of user connections purchased by corporation at 104.

Figure 11:
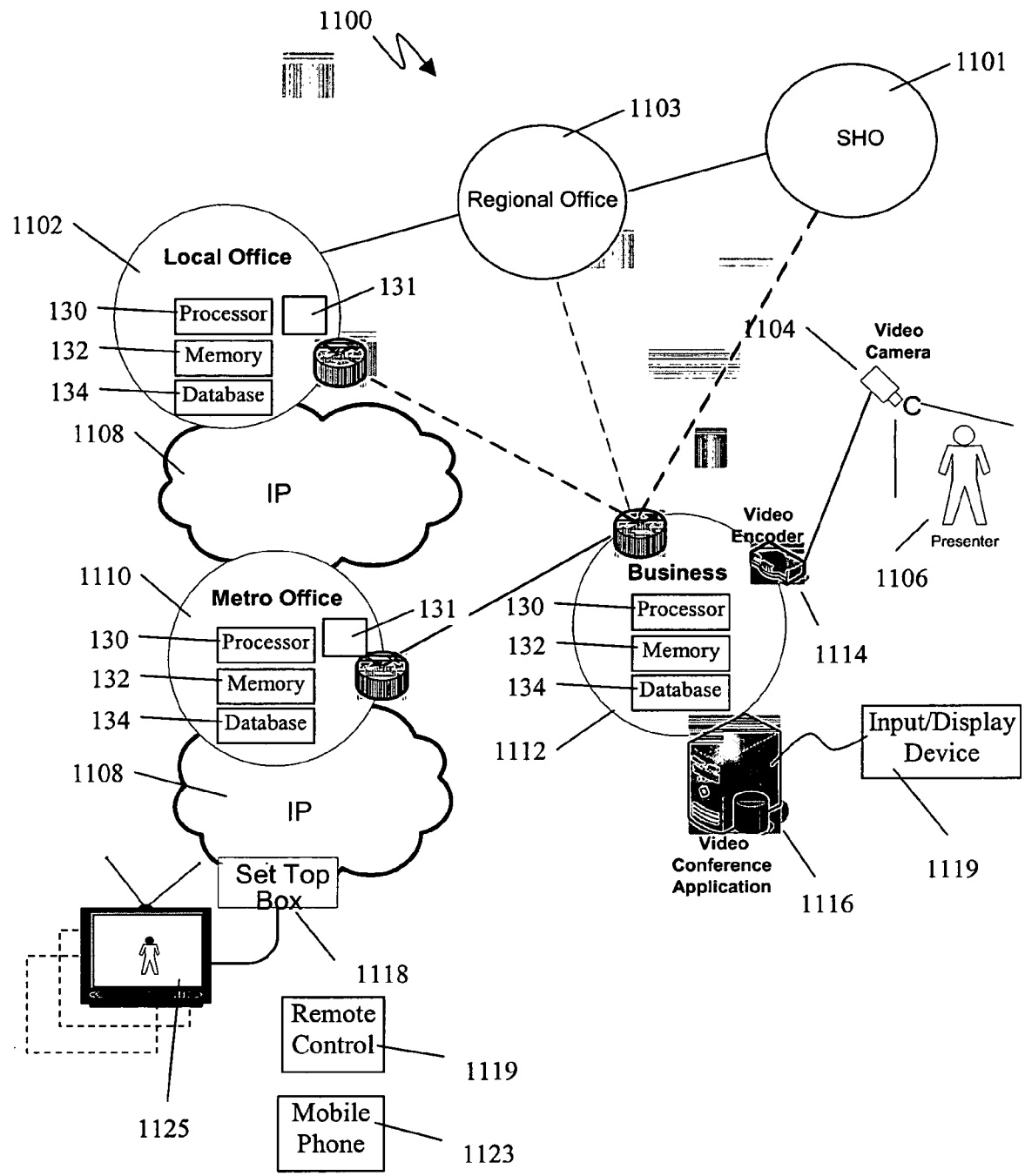
FIG. 11 is a schematic diagram depicting another illustrative embodiment showing delivery of a video conference to a teleworker employee through a regional head end office in a internet protocol television (IPTV) system.

The number of user connections selected is the maximum number of total IPTV users that can view the conference video data feed from the IPTV service. The IPTV Service Provider will provide access to the IPTV network for the corporation to provide video conferencing to the corporation's remote (teleworker) employees 106 over the video conference channel. The user interacts with the GUI by using the input display device as shown in FIG. 11 to select GUI menu fields and supply data to select GUI menu items. The data input from the user via the input display device to the GUI is stored in memory. The locations button 108 when selected on the GUI moves the user to a menu of video origination locations at corporation that the corporation wishes to designate as able to present video to IPTV users 108. Selection of the registered IPTV users with entity button 110 takes the corporate administrator to a GUI menu or web page to add available IPTV/ corporate users as registered users (video conference participants) of the video service.

Figure 2:
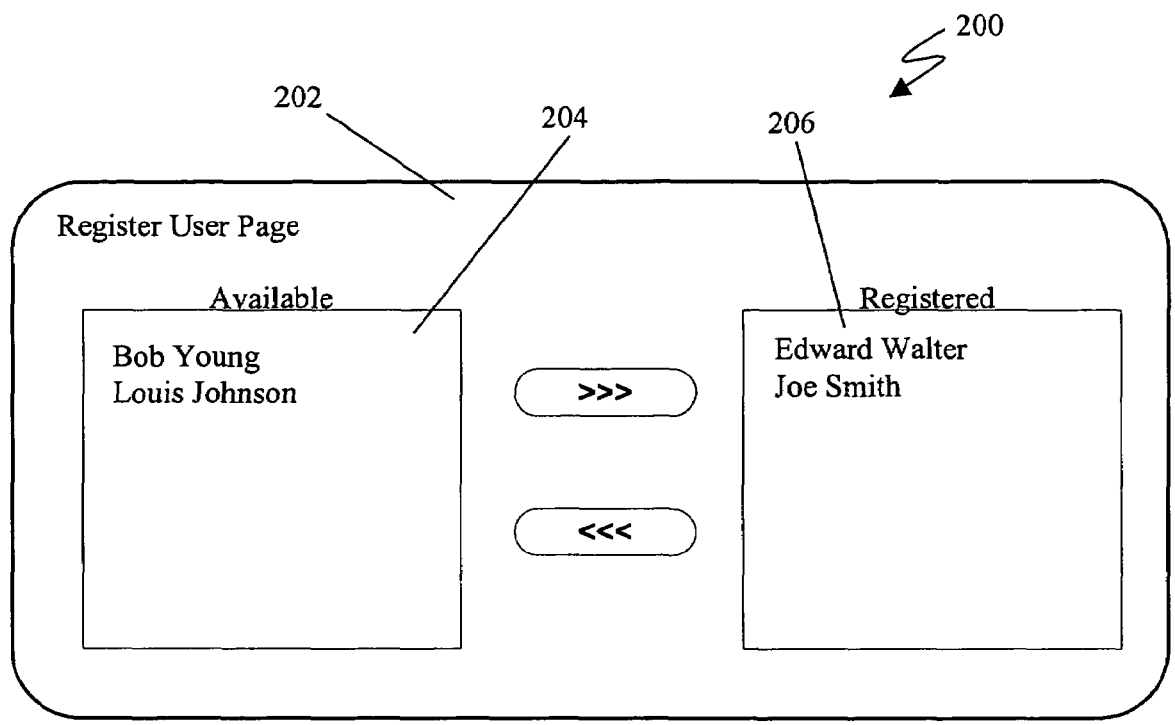
FIG. 2 is a schematic diagram depicting another illustrative embodiment showing a graphical user interface for selecting participants in a video conference.

Turning now to FIG. 2, FIG. 2 is an illustrative embodiment 200 of the register video conference participant (user) menu page 202. Available at 204 are those IPTV video conference participants (users) that have configured their STB with the entity code for the video service provider. Registered users are those IPTV users that are selected by the corporate administrator and "moved" into this location 206.

Figure 3:
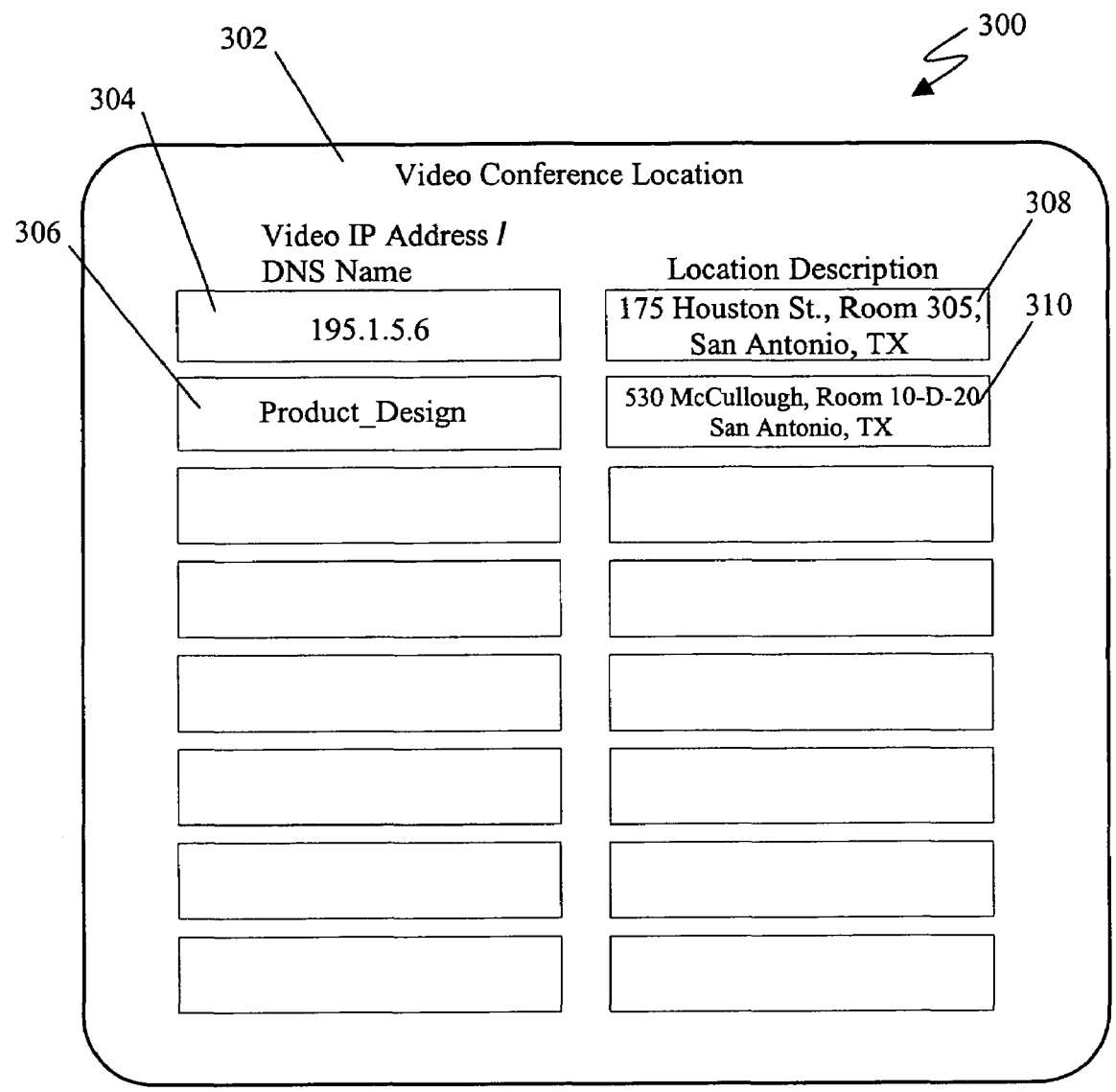
FIG. 3 is a schematic diagram depicting another illustrative embodiment showing a graphical user interface for selecting a location for a video conference.

Turning now to FIG. 3, FIG. 3 is an illustrative embodiment 306 depicting the video conference location selection menu 302. The video conference location is an IP address for the video conference data. The video conference data is generated from a location where a presenter 1106, video camera 104, video encoder 1114 and video application computer 1116, as shown in FIG. 11 are located. The input/display device 1119 for interacting with the GUI for selecting the video location and the video conference participants may also be located at the video location but can also be located in a central location in communication with the video conference application processor 1116. The location may be a video IP address 304 or a domain naming system (DNS) 306. The location description is displayed at 308 and 310. Once the video conference has been scheduled and a group of video conference participants selected, a notification message is sent out to the group of video conference participants announcing the pending video conference.

In addition, the event will alert the video conference participants via a group of the STBs to any video conference participant viewing the IPTV content by flashing a message on the bottom of the screen to turn to the video conference channel, "channel 100" for a pending video conference. The alerts and notification periods are also configurable to the consumer. Generally, all IPTV network subscribers are allocated a single video conference channel in the IPTV system, e.g., channel 100. A subscription server 131 maps a multi cast or unicast of the video conference data onto channel 100 for a group of STBs associated with the group of video conference participants. The video conference channel, i.e., channel 100, is designated by the IPTV SP to be shared by all IPTV network subscribers, however, only those members of a particular group of video conference participants will receive a particular video conference data multicast or unicast on channel 100, as designated for that group to which they belong or are associated on the shared video conference channel. Those IPTV subscribers not belonging to a group are delivered background video content such as advertisements and are unable to view the group video conference.

Figure 4:
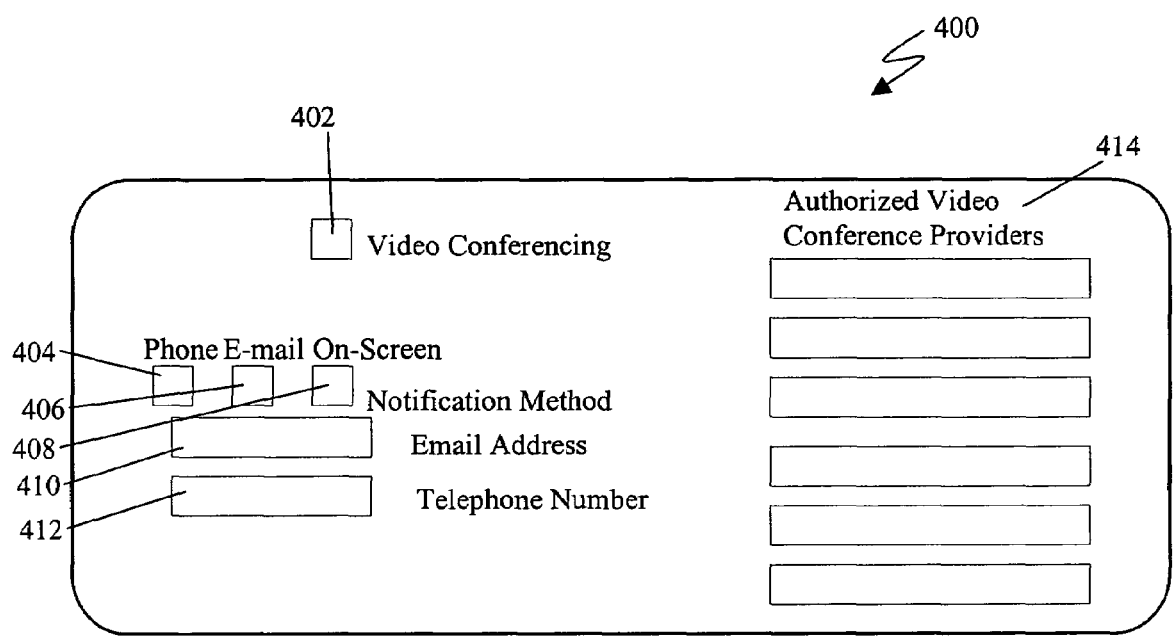
FIG. 4 is a schematic diagram depicting another illustrative embodiment showing a graphical user interface for selecting a video conference option, notification methods and authorized video conference providers.

Turning now to FIG. 4, FIG. 4 is an illustrative embodiment 400 which shows a video conference selection option 402 that can be selected by a potential video conference participant at their STB 1118. The potential video conference participant via the STB 1118 has the option of selecting one of three notification methods which include phone 404, email 406, and on-screen 408 notifications. The potential video conference participant's notice email address and phone number are entered by the potential video conference participant and displayed at 410 and 412 respectively. A GUI is presented on the STB display 1125 as shown in FIG. 4 and menus presented for data entry with which the user interacts using remote control 1119. Authorized video conference providers are presented and can be selected by the potential video conference participant, as shown at 414. For the consumer (or potential video conference participant) the configuration screen GUI allows for the video conference option 402 to be selected. Until the "video conference" option 402 is selected all other fields in the menu are non-configurable.

Figure 5:
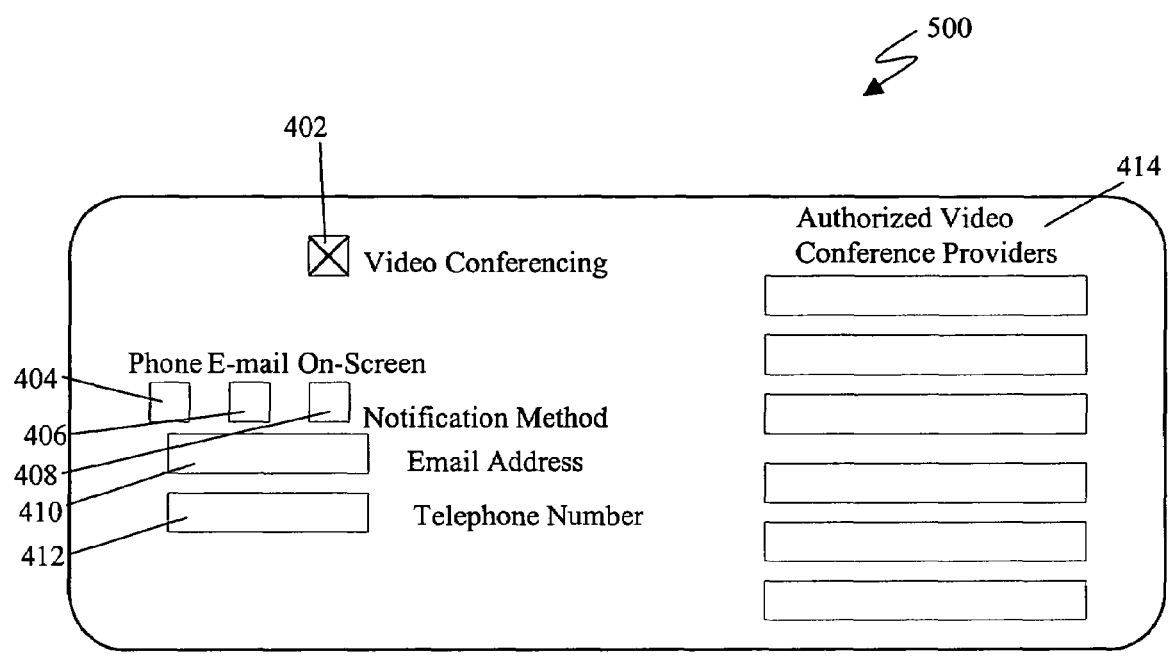
FIG. 5 is a schematic diagram depicting another illustrative embodiment showing a graphical user interface having selected a video conference option.

Turning now to FIG. 5, FIG. 5 is an illustrative embodiment which shows video conference option at 402 is selected. Once the "video conference" option 402 has been selected the remaining fields on the menu become available.

Figure 6:
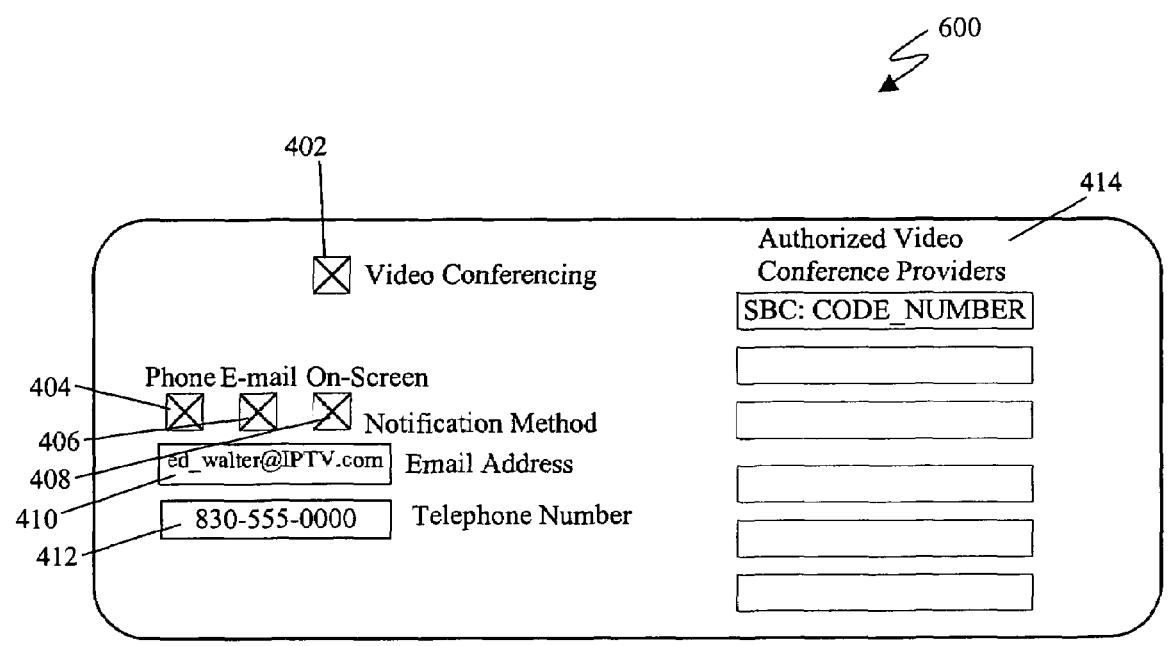
FIG. 6 is a schematic diagram depicting another illustrative embodiment showing a graphical user interface having selected a video conference option, notification methods and authorized video conference providers.

Turning now to FIG. 6, FIG. 6 is an illustrative embodiment which shows the video conference option 402 selected. The video conference participant has selected all three notification methods which include phone 404, email 406, and on-screen 408. The user's email address and phone number are displayed at 410 and 412 respectively. Authorized videoconference providers are shown at 414. The corporation or conference provider will provide an access code to teleworker /consumer at 414. As displayed in FIG. 6 the consumer has configured the IPTV STB with the relevant information to allow video conference broadcast data to be sent from the corporation to the consumer. The consumer will be notified via phone messages, email, and on-screen prompts of the scheduled video conference along with the number or identification of the video conference channel to tune to on the STB (Channel 100) as well as a URL link if web access is made available to the video conference data.

The other option is to provide scheduling access directly from a user's calendar. A corporate user could select the video conference time and click on an integrated IPTV applet. This applet would provide special hooks for scheduling a video conference via IPTV.

Figure 7:
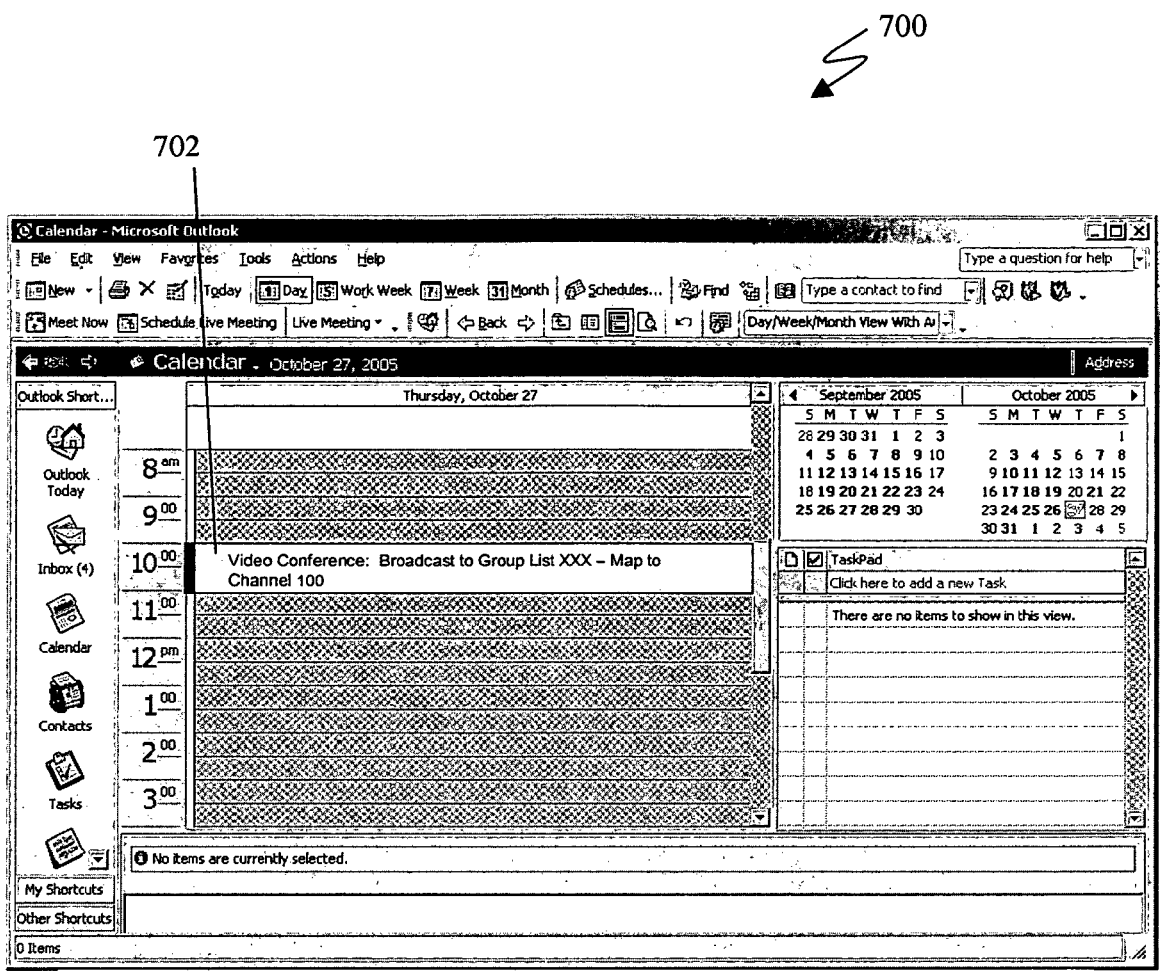
FIG. 7 is a schematic diagram depicting another illustrative embodiment showing a scheduled video conference.
Figure 8:
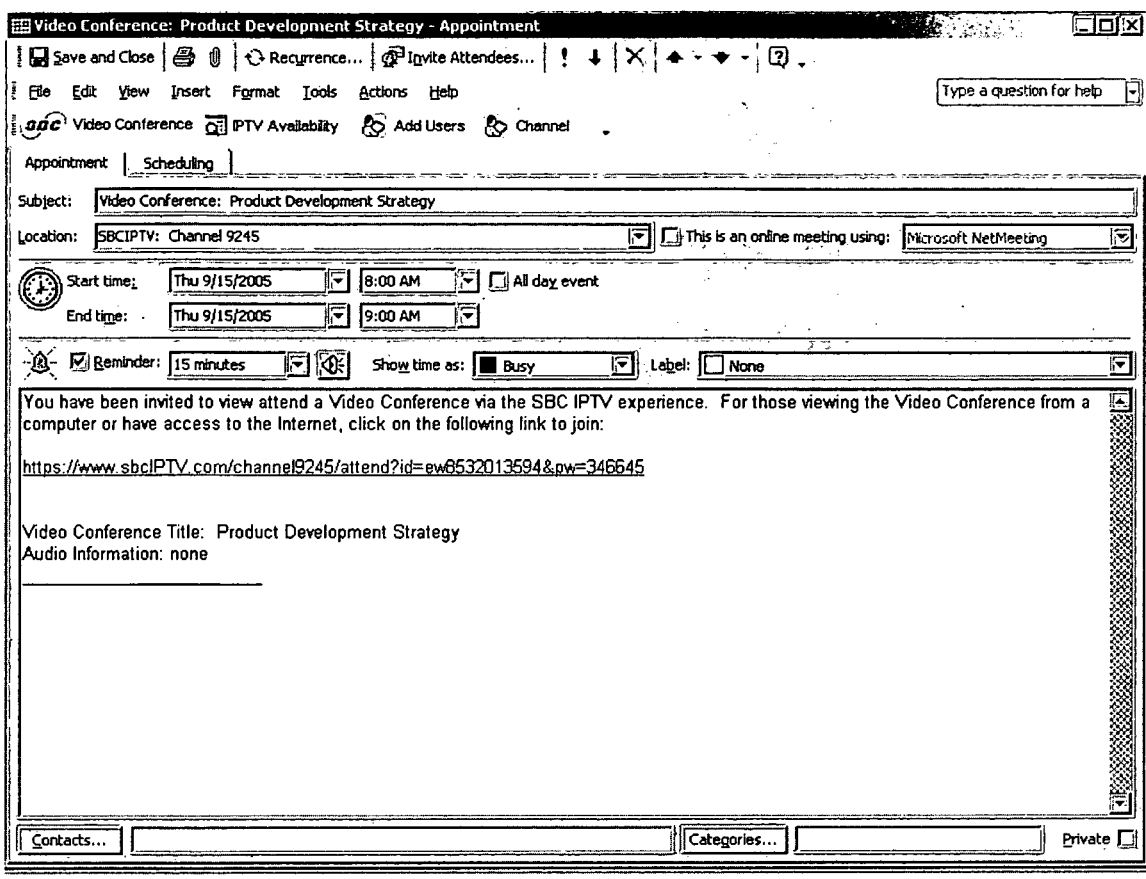
FIG. 8 is a schematic diagram depicting another illustrative embodiment showing a scheduled video conference.

Turning now to FIG. 7, FIG. 7 is a example of an illustrative embodiment screenshot of a videoconference scheduled GUI for a user. The final result of scheduling the video conference via the IPTV IP backbone over the video conference channel 100 is identified. The configuration option is provided in FIG. 8. Turning now to FIG. 8, FIG. 8 is a screenshot of an invitation the user received to attend a videoconference scheduled for the user. Other services provided are IP Telephony and PSTN connectivity to the video conference video and audio data. The term video data used herein is used to include both video data and audio data associated with the video data. The Enterprise would have the option of selecting either one-way broadcast, where the video and audio content would only come from the enterprise and would be dispersed to selected IPTV consumers.

An optional enhancement would be to enable the enterprise to select to allow voice conversation between the video conference origination location and the consumer. The audio data which is associated with the video conference data can be duplicated and supplied to a video conference participant via a mobile receiving device such as a cell phone, as the video conference participant has left his STB to which the video conference data is being sent. As part of the information provided by the consumer for the enterprise is a contact number for bridging voice conversation so that audio data can be exchanged between video conference participants and the video conference origination location. The provisioning of services via a GUI or web portal allows for the delivery of video conference data services with minimal costs. It allows flexibility and the development of services. The resell of a video conference connection and distribution of Enterprise/ Business content to remote IPTV teleworker employees provides for a service that could add substantial value to an IPTV network offering. In addition, it presents an opportunity to resell the IPTV communication network beyond just a consumer service.

Figure 9:
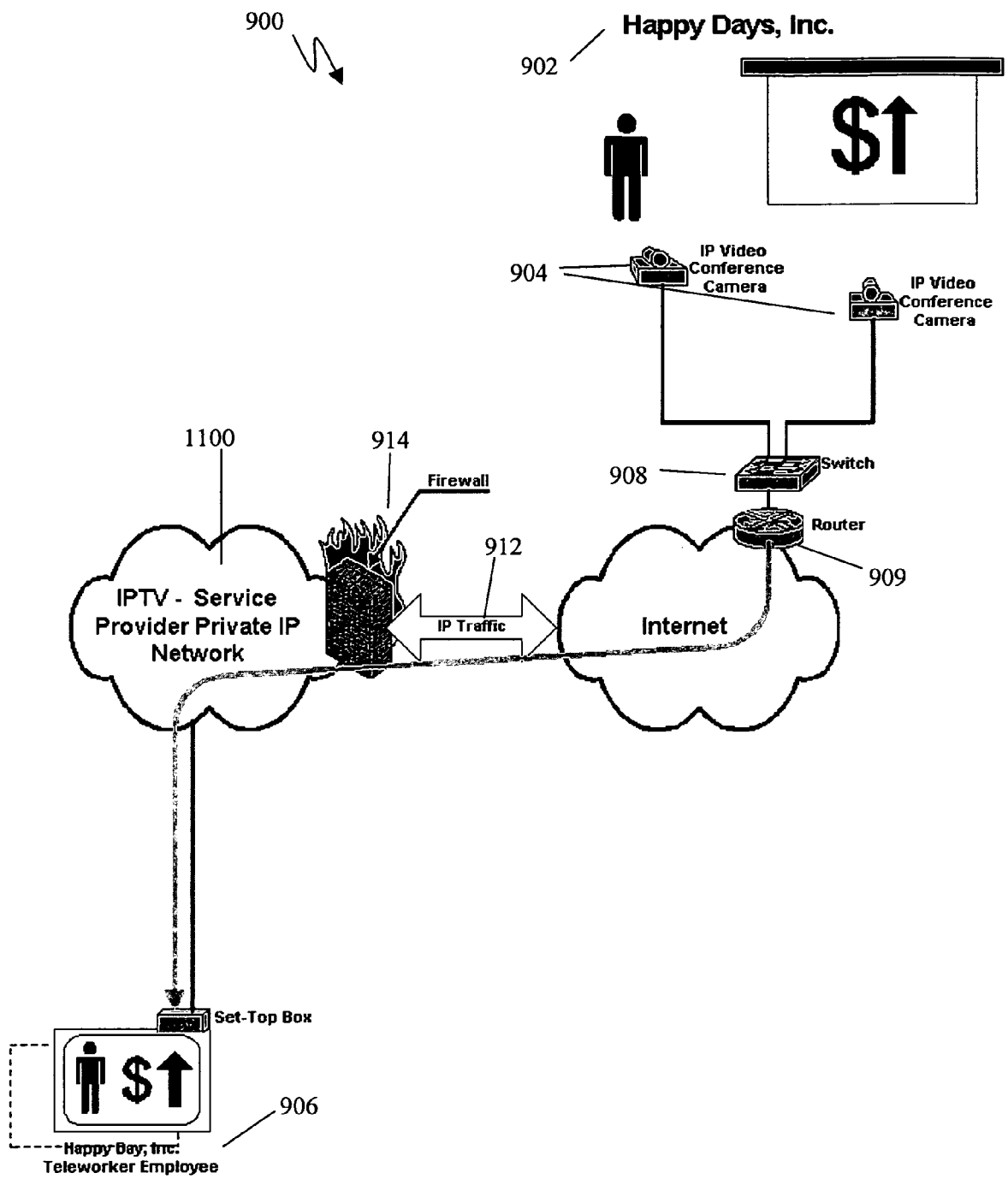
FIG. 9 is a schematic diagram depicting another illustrative embodiment showing delivery of a video conference to a teleworker employee.

Turning now to FIG. 9, FIG. 9 is a diagram 900 outlining the corporation 902 (Happy Days, Inc.) originating video conference data from IP video cameras 904 and wants to include specific remote teleworkers' video conference participants' STBs 906. The video conference data can be sent through a switch 908 through a router 909 to the Internet is provided across a firewall 914 to a private or public IPTV network 1100. The IPTV network is shown in more detail in FIG. 11. Thus access from selective Internet-based video over IP traffic 912 (or other content) would traverse the IPTV network firewall 914.

Figure 10:
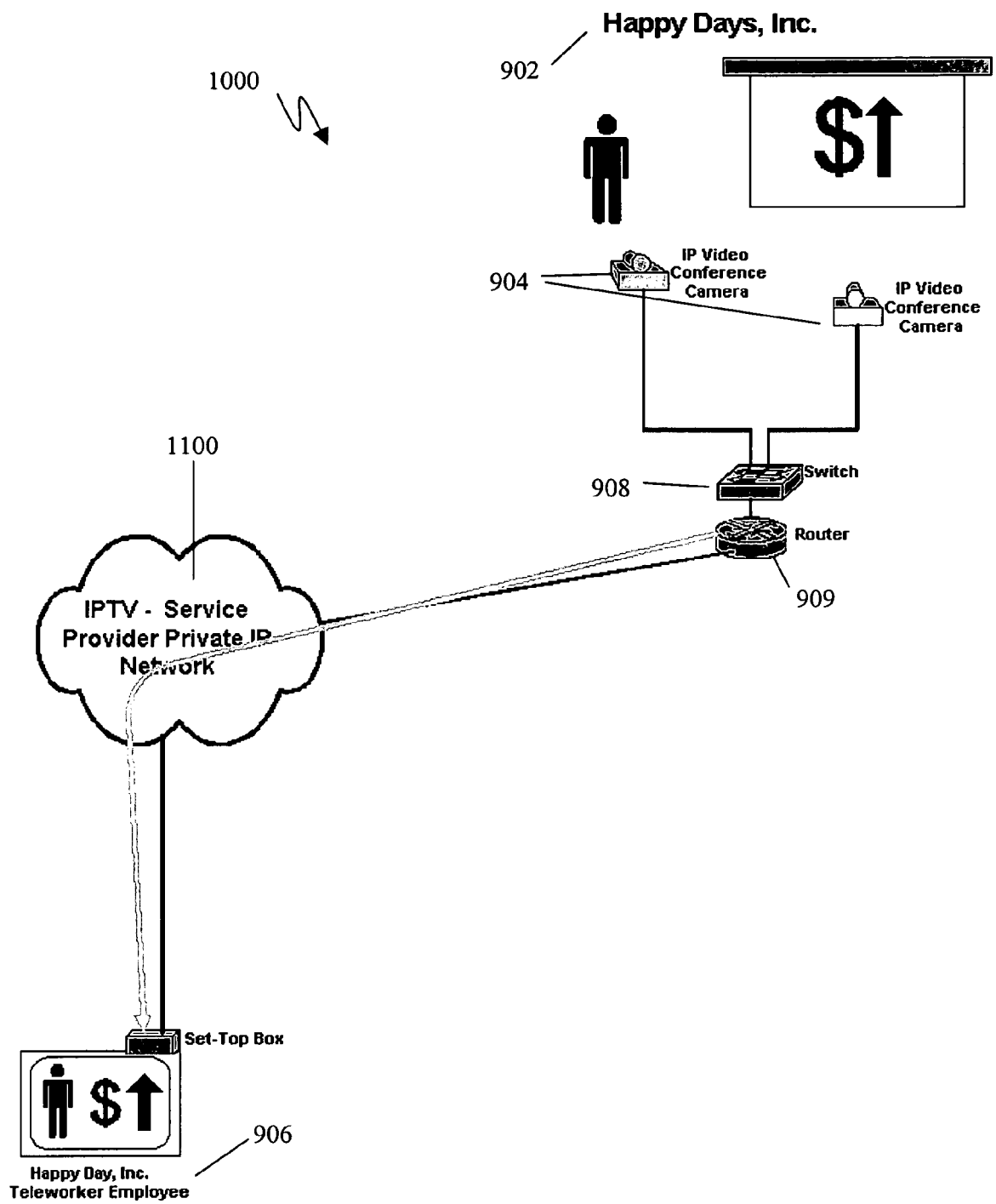
FIG. 10 is a schematic diagram depicting another illustrative embodiment showing delivery of a video conference to a teleworker employee.

Turning now to FIG. 10, FIG. 10 is another optional architecture for a video conference data 904 service to directly connect the customer to the IPTV (Internal IP Network) 1100 as a provider service. The corporation 902 (Happy Days, Inc.) originating video conference data from IP video cameras 904 and wants to include specific remote teleworkers' STBs 906. The video conference data can be sent through a switch 908 through a router 909 to the Internet to a private or public IPTV network 1100 and to the video conference participants' STBs 906.

An ITPV network using for example, ADSL2/VDSL or fiber-to-the-premises connection would be provided to the Enterprise 902 (Happy Days, Inc.) for the purpose of distribution of IP Video conference data from IP video camera 904 to remote IPTV users/video conference participants' STBs 906. The video would be directly fed into the IPTV network 1100. This video content would then be distributed by the ITPV network as video content over a video conference channel (e.g., channel 100) to specific subscribers identified by the Enterprise.

With the Video Conference option of offering a Video conference data as a feed through the IPTV network the video conference data would be mapped as a multicast to a designated video conference channel and a group of STBs associated with a group of video conference participants. Thus the video conference is offered only to the specific STBs identified through data inputs to the GUI by the corporation at the head-end of the video conference. The IPTV SP would then map the video conference to a designated video conference channel, e.g., channel 100, and provide a notification to the users (video conference participants) of the IPTV service 1100.

A second option is when the video conference data is directly mapped such as an IP address mapping from the corporation out to the Set-Top Box. The video is decrypted at the set-top box and therefore this feature would include additional enhancement to support direct un-encrypted video communication from a $3^{rd}$ party source.

Also, the integration with the IP Telephony (an integrated offering with IPTV network) the integration of 2-way voice is achieved as a packet delivered service. Also, part of the control of when and who speaks can be offered to the Video origination location. An assigned video conference administrator could control with Voice over IP (real time protocol (RTP) Stream) would be allowed to speak by manually "muting" a specific URL link that is associated to a specific attendee of the Video Conference.

Turning now to FIG. 11, FIG. 11 is a diagram outlining provision of video conference data over an IPTV network. The IPTV network 1100 architecture is hierarchically organized into segments or geographical locations. These segments in decreasing hierarchical order distribute video data to smaller and more localized service groups of IPTV network STBs. In an illustrative embodiment, the IPTV network provides a network of servers in a hierarchical order, where each higher level in the hierarchy feeds servers on the lower levels of the hierarchy. The hierarchical order of servers in decreasing order in the hierarchy is super head end office (SHO) 1101, regional office 1103, local office 1102 and metro office 1110. The SHO feeds data to a group of regional offices. Each regional office feeds a group of local offices. Each local office feeds data to a group of metro offices. The metro offices feed data to STBs with the video data. The video conference participants receive data from a server on a hierarchical level most closely associated with the STBs for the for video conference participants.

The IPTV network distributes video conference data to a group of STBs associated with the video conference participants for the video conference from a server lowest in the hierarchy of servers that sends data to each of the STBs in the group of STBs. For example, if all STBs for video conference participants receiving a particular video conference data are within an area served by a single metro office server, the metro office server is the lowest in the hierarchy associated with the STBs and the video conference data is distributed from the metro server. If all STBs for video conference participants receiving a particular video conference data are within an area served by more than one metro server, the local office server that feeds the metro servers is the server lowest in the hierarchy associated with the STBs and the video conference data is distributed from the local server. If all STBs for video conference participants receiving a particular video conference data are within an area served by more than one local server, the regional office server is the server lowest in the hierarchy that feeds data to the STBs and the video conference data is distributed to the STBs from the regional server. If all STBs for video conference participants receiving a particular video conference data are within an area served more than one regional server, the SHO office server is the server is the lowest server in the hierarchy that feeds the STBs and the video conference data is distributed from the SHO server. Thus each group of STBs participating in a video conference receive video conference data from a hierarchical geographically located server lowest in the hierarchy that sends data to each of the group of STBs associated with the video conference participants. Each office SHO 1101, regional office 1103, local office 1102 and metro office 1110 includes a processor 130, memory 132 and database 134. The processor is coupled to the memory and database. Computer program instructions that can be executed by the processor 130 are stored in memory 132.

As shown in FIG. 11, a video conference application 1116 exists at a business server 1112. The video conference application accesses the processor 130, memory 132 and database 134 for controlling the video camera 1104 to distribute video data from a presentation by presenter 1106 at the business location server. The video encoder 1114 takes camera input from camera 1104 and encodes the video data. The business application sends the encoded video data to the metro office 1110 which distributes the video data to STBs 1118. Input to the video conference application which includes interaction with the corporate GUI menus described herein is accomplished through input/display device 1121. Interaction with teleworker or consumer menus described herein is accomplished by remote control 1110 associated with the STB. A video conference participant may receive the audio portion of the video data on a mobile device, such as a cell phone 1123. The STB GUI menus are stored in the memory accessible to the STB, the corporate administrator GUIs are stored in memory accessible to the video conference application server processor 1115.

National video conference data designated for distribution to teleworkers from more than one regional office is distributed from the SHO to the regional offices. Regional video conference data designated for distribution to teleworkers from more than one local office is distributed from the regional office to the local offices. Local video conference data designated for distribution to teleworkers from more than one metro office is distributed from the local office to the metro offices. Metro video conference data designated for distribution to teleworkers from one metro office is distributed from the metro to the video conference participants/teleworkers.

From a design standpoint the conference video could be either spliced into and distributed from the IPTV network at the local or national point depending on the company and required coverage among the IPTV users. The video data is inserted into the IPTV network and distributed from the hierarchical segment of the IPTV network closest to all or a majority of all video conference participants. If a national corporation having teleworkers or video conference participants nation wide broadcast a video conference data presentation to its employees and teleworkers then that video conference data would be introduced and broadcast from the national or super/central head end office. If a local CPA were broadcasting a video conference it would probably be introduced and broadcast in at the local or metro office.

The IPTV network includes one or more subscription servers 131 which manage the channel "line up" or list of available channels for each STB associated with a subscriber to the IPTV network. The subscription server(s) communicates with each STB to tell each STB which IP address to access for each channel. Each group of STBs associated with each group of video conference participants is sent a different IP address to tune to for channel 100 to access their particular video conference data. Operationally each individual STB has a unique ID which can be used within the Subscription Server to decide what channels (mapped to multicast IP Addresses) that the STB will see. To minimize operational impacts usually this mapping of channels can be performed by grouping together video conference participants. An IPTV SP selects a video conference channel (i.e., channel 100) that is designated for video broadcast to video conference participants, i.e., employees and teleworkers groups receiving particular video conference data on the video conference channel would be created based upon the information provided by the employer and employee when subscribing to the IPTV service. This grouping would then make it easier to map large numbers of users with common interest (i.e. they all work for the same employer) to a specific channel.

For example, Bill, Tom, and Ed all work for corporation A. John and Frank work for corporation B. All workers are located in San Antonio. Bill, Tom and Ed all provided in their application as subscribers and potential video conference participants to IPTV network that they worked for corporation A. When corporation A subscribed to be a video conference provider to its employees, the corporation also included Bill, Tom, and Ed as employees of corporation A. Thus, Bill, Tom and Ed are all added to the GUI menu data for the corporation. A video conference GUI for selection as potential video conference participants from the GUI. The process would also accommodate when an employee left or is newly added to the corporation. The IPTV SP then takes Bill, Tom and Ed and places them in a group called corporation A (which could be named anything). Bill, Tom and Ed's STB Ids are collected within the corporation A group so the IPTV subscription server will know which STBs should be able to get corporation A video conference data. Some are all of the potential video conference participants including Bill, Tom and Ed may be selected to receive a particular video conference from Corporation A. These groups are used to facilitate the administration or operational aspect of managing the subscription application. The corporation A group is uploaded to the subscription server. As part of the data are the unique STB Ids for Bill, Tom, and Ed; the multicast IP address for the corporation A Content Server; and the channel to be assigned.

In an illustrative embodiment, all video conference data is assigned to the video conference channel, e.g., channel 100. John and Frank (and corporation B) go through the same steps. The difference is that the STB Ids will be those for John and Frank and the multicast or unicast IP address for the vide conference data will be for the multicast or unicast address for the corporation B video conference data. The designated video conference channel is the same, e.g., channel 100. There is no conflict since only one channel can be used for each corporation's employee message broadcasting. Grouping of individuals (and their STBs) can be by interest, i.e. by church affiliation, community, employer, etc. For the audio data only option can be a conference bridge function.

The video and audio are provided across a video content server. This server would be supplemented with an associated front end conference server. A conference number would be associated to the video/audio feed from the video content server. When a user calls in they would initially bridge at the conference server which is a large Multi-Conferencing Unit (MCU) having a group of DSP (Digital Signal Processors) for distributing audio to video conference participants. Since the conference server may not support video, the video component of the session would be dropped and only the audio portion would be broadcast across the conference bridge to the video conference participant associated with the STB identifier in a group associated with a the video conference. Thus, when a video conference participant leaves an STB designated to receive the video conference data, the video conference participant can continue to receive the audio data portion of the vide conference data.

Figure 12:
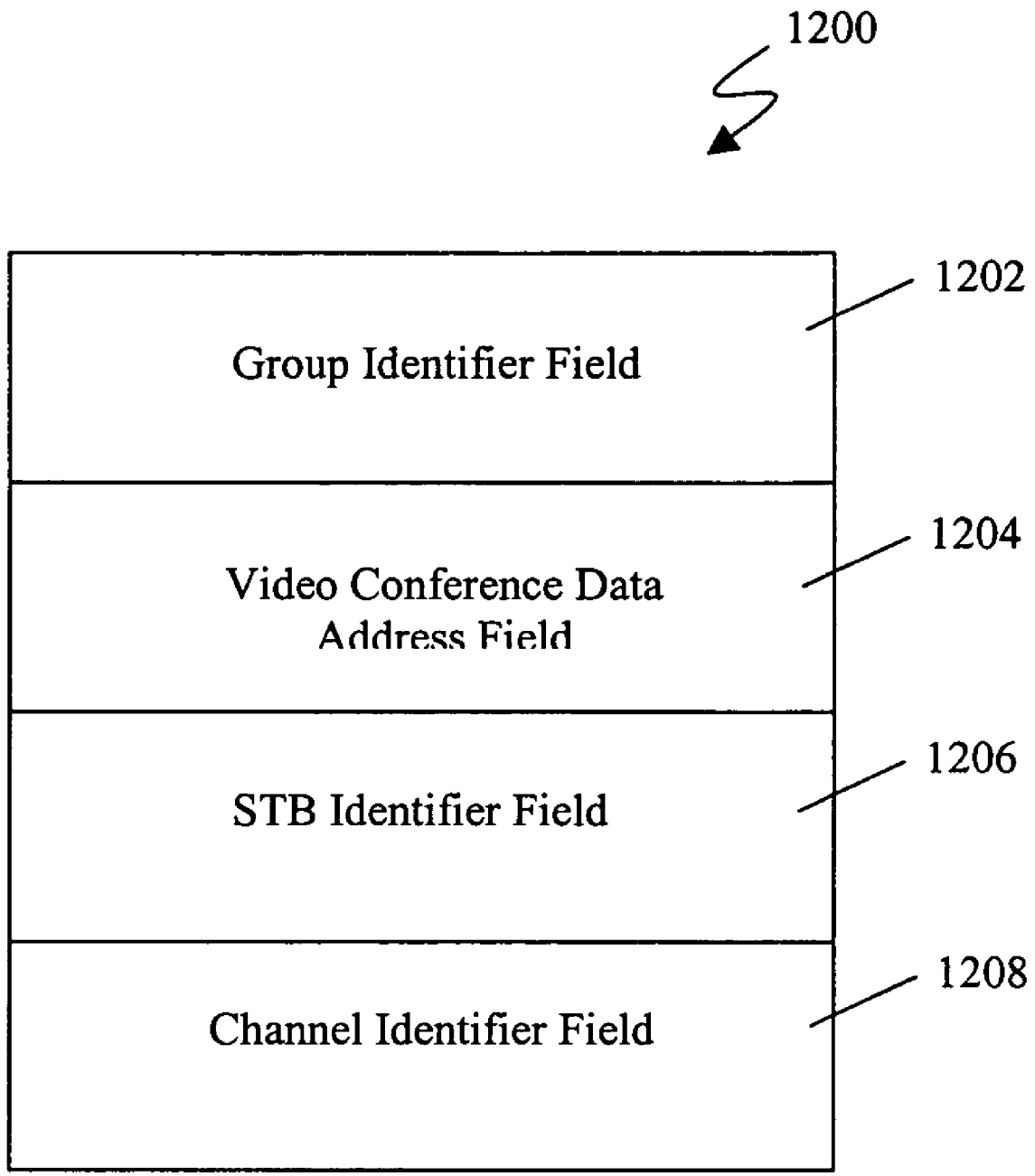
FIG. 12 is a is a schematic diagram depicting another illustrative embodiment showing a data structure for identifying video conference participants.

Turning now to FIG. 12, a data structure 1200 is disclosed including a group identifier field 1202 for containing data identifying a group of video conference participants, a video conference data address field 1204 for containing data identifying an address for video conference data for delivery of the video conference data to the video conference participants over an IPTV channel and a STB identifier field 1206 for identifying a plurality of STB identifiers associated with the group of video conference participants for mapping the channel to the video conference address field. The data structure may further include a channel identifier field 1208 for containing data identifying the channel in an IPTV network for distributing video conference data to the video conference participants.

In an illustrative embodiment, a set of application program interfaces is provided in the memory at the server or other location or embodied on a computer readable medium for execution on a computer in conjunction with an application program that distributes video conference video data over an IPTV channel to a group of video participants. The set of application program interfaces include but not limited to a first interface that receives a group identifier data identifying a group of video conference participants, a second interface that receives data representing a video conference data address identifying an address for video conference data for delivery of the video conference data to the video conference participants over an IPTV channel and a third interface that receives a STB identifier field for identifying STB identifiers associated with the group of video conference participants for mapping the channel to the video conference address field. The set of application program interfaces may further include but is not limited to a fourth interface that receives a channel identifier field for containing data identifying the channel in an IPTV network for distributing video conference data to the video conference participants.

Figure 13:
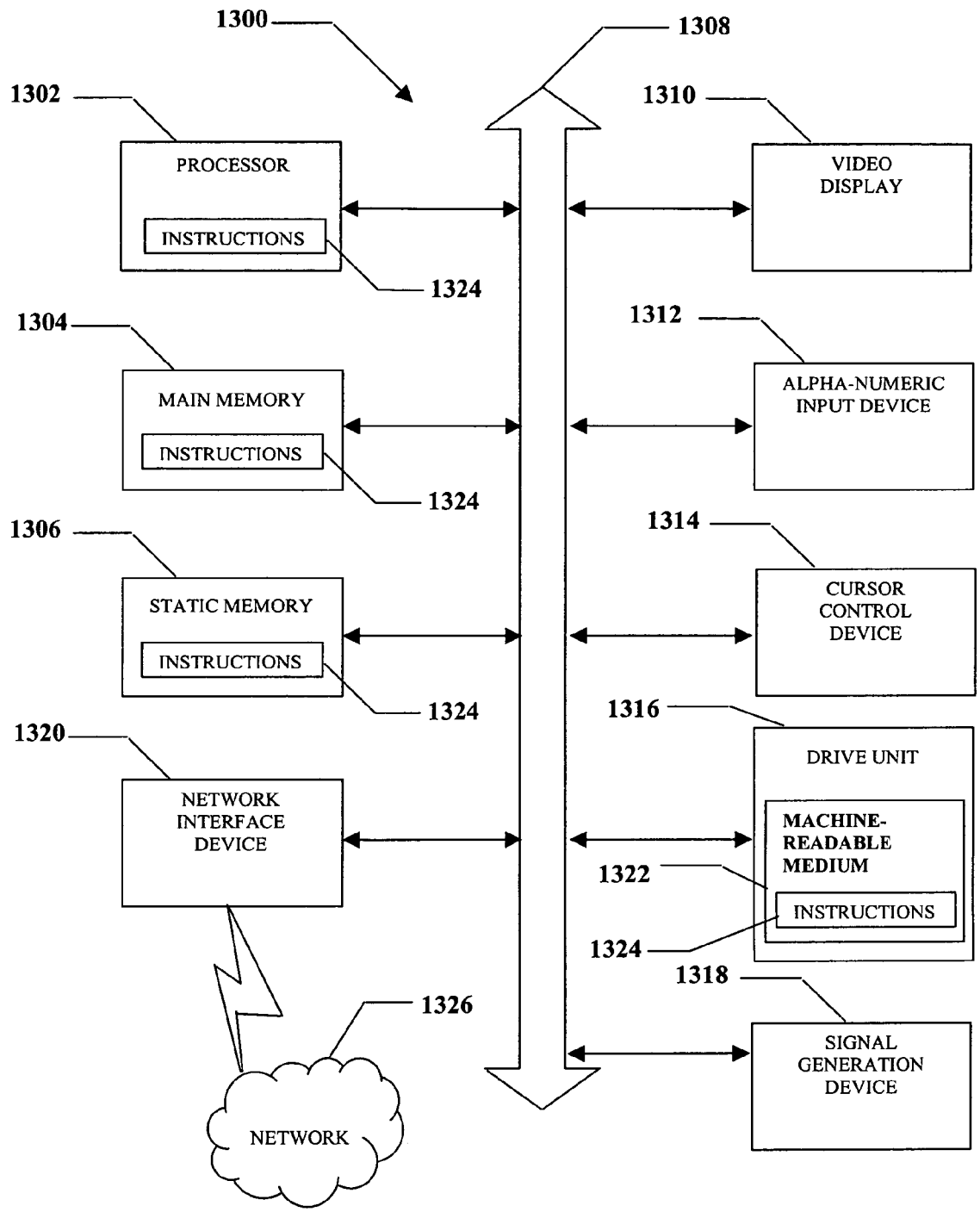
FIG. 13 is a diagrammatic representation of a machine in the form of a computer system within which a set of instructions, when executed, may cause the machine to perform any one or more of the methodologies of the illustrative embodiment.

Turning now to FIG. 13, FIG. 13 is a diagrammatic representation of a machine in the form of a computer system 1300 within which a set of instructions, when executed, may cause the machine to perform any of one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU), or both), a main memory 1304 and a static memory 1306, which communicate with each other via a bus 1308. The computer system 1300 may further include a video display unit 1310 (e.g., liquid crystals display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated in herein above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a computer readable medium containing instructions 1324, so that a device connected to a network environment 1326 can send or receive voice, video or data, and to communicate over the network 1326 using the instructions 1324. The instructions 1324 may further be received over a network 1126 via the network interface device 1320.

While the computer-readable medium 1322 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methodologies of the illustrative embodiment.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the illustrative embodiment is considered to include any one or more of a machine-readable medium, computer-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A computerized method for distributing video conference data over an internet protocol television (IPTV) system, comprising:
   allocating at a server in the IPTV system, a single IPTV video conference channel to a plurality of groups of video conference participants' set top boxes (STBs), wherein each of the plurality of groups of STBs receives a different one of a plurality of video conferences data over the single video conference channel;
   accessing first STB data at the server indicating a first group of video conference participants' STBs in the plurality of groups of video conference participants' STBs, the first group of STBs being associated with a first one of the plurality of video conferences data;
   mapping at the server, an internet protocol (IP) address for the first one of the plurality of video conferences data to the first group of video conference participants' STBs IP addresses;
   sending from the server over the single IPTV video conference channel from the first one of the plurality of IP addresses, the first one of the plurality of video conferences data to the first group of video conference participants' STBs;
   mapping at the server, a second one of the plurality of IP addresses for a second one of the plurality of video conferences data to a second group of video conference participants' STBs IP addresses, wherein the first one of the plurality of video conferences data and the second one of the plurality of video conferences data are different video conference data;
   duplicating audio data from the first one of the plurality of video conferences data;
   sending the duplicated audio data, concurrently with the video broadcast during the video conference, to a mobile device associated with a video conference participant associated with one of the plurality of STBs in the first group whom has left the one of the plurality of STBs in the first group during the video conference; and
   sending from the server over the single IPTV video conference channel from the second one of the plurality of IP addresses, the second one of the plurality of video conferences IP data to the second group of video conference participants' STBs.

2. The method of claim 1, further comprising:
   inserting the first one of the video conferences data into the IPTV system at a server lowest in an IPTV server hierarchy that is closest to and sends data to the STBs in first group of video conference participants' STBs.

3. The method of claim 2, wherein the server lowest in the IPTV server hierarchy is selected from a group consisting of a super head end office, regional office, local office and metro office.

4. The method of claim 1, wherein the first video conference data further comprises IP audio data, the method further comprising:
   mapping the IP audio data to an IP address for a mobile device associated with an STB for a video conference participant;
   sending the IP audio data to a video conference participant mobile device STB associated with the video conference participant;
   receiving audio data from the mobile device IP address; and
   selectively muting audio input from the mobile device IP address to control when and which video conference participant speaks in the video conference.

5. A computer readable medium containing instructions that when executed by a computer perform a method for video conferencing, the method comprising:
   allocating at a server in the IPTV system, a single IPTV video conference channel to a plurality of groups of video conference participants+ set top boxes (STBs), wherein each of the plurality of groups of STBs receives a different one of a plurality of video conferences data over the single video conference channel;
   accessing first STB data at the server indicating a first group of video conference participants' STBs in the plurality of groups of video conference participants' STBs, the first group of STBs being associated with a first one of a plurality of video conferences internet protocol (IP) data;
   mapping at the server, the first one of the plurality of video conferences data to the first group of video conference participants' STBs IP addresses; and
   delivering from the server over the single IPTV video conference channel from the first one of the plurality of IP addresses, the first one of the plurality of video conferences data to the first group of video conference participants' STBs.

6. The medium of claim 5, wherein in the method allocating the video conference channel further comprises:
   mapping at the server, a second one of the plurality of IP addresses for a second one of the plurality of video conferences IP data to a second group of video conference participants' STBs IP addresses; and
   delivering from the server over the single IPTV video conference channel from a second one of the plurality of IP addresses, the second one of the plurality of video IP conferences data to the second group of video conference participants' STBs.

7. The medium of claim 5, the method further comprising:
   inserting the first one of the video conferences IP data into the IPTV system at a server lowest in an IPTV server hierarchy that is closest to and sends data to the STBs in the first group of video conference participants' STBs.

8. The medium of claim 5, wherein the server lowest in the IPTV server hierarchy is selected from a group consisting of a super head end office, regional office, local office and metro office.

9. The medium of claim 5, wherein in the first video conference data further comprises IP audio data, the method further comprising:
mapping the IP audio data to an IP address for a mobile device associated with an STB for a video conference participant;
sending the IP audio data to a video conference participant mobile device STB associated with the video conference participant;
receiving audio data from the mobile device IP address; and
selectively muting audio input from the mobile device IP address to control when and which video conference participant speaks in the video conference.

10. A video conference system comprising:
a memory containing a group of video conference participants;
a processor coupled to the memory; and
a computer program stored in the memory, the computer program comprising, instructions to access first STB data at the server indicating a first group of video conference participants' STBs in the plurality of groups of video conference participants' STBs IP addresses, the first group of STBs being associated with a first one of a plurality of video conferences data, instructions to map at the server, an internet protocol (IP) address for the first one of the plurality of video conferences data to the first group of video conference participants' STBs IP addresses; and
instructions to deliver from the server over the single IPTV video conference channel from the first one of the plurality of IP addresses, the first one of the plurality of video conferences data to the first group of video conference participants' STBs allocating at a server in the IPTV system, a single IPTV video conference channel to a plurality of groups of video conference participants' set top boxes (STBs), wherein each of the plurality of groups of STBs receives a different one of a plurality of video conferences data over the single video conference channel.

11. The system of claim 10, the computer program further comprising instructions to map at the server, a second one of the plurality of IP addresses for a second one of the plurality of video conferences data to a second group of video conference participants' STBs IP addresses; and
delivering from the server over the single IPTV video conference channel from the second one of the plurality of IP addresses, the second one of the plurality of video conferences IP data to the second group of video conference participants' STBs.

12. The system of claim 10, the computer program further comprising instructions to insert the first one of the video conferences data into the IPTV system at an IPTV server lowest in a server hierarchy that is closest to and sends data to the STBs in first group of video conference participants' STBs.

13. The system of claim 12, wherein the server lowest in the IPTV server hierarchy is selected from a group consisting of a super head end office, regional office, local office and metro office.

14. The system of claim 10, wherein the first video data further comprises IP audio data, the computer program further comprising:
instructions to map the IP audio data and IP address for a mobile device for a video conference participant;
instructions to send the audio data to the IP address for the mobile device for the video conference participant;
instructions to receive audio data from the mobile device IP address; and
instructions to selectively mute audio input from the mobile device IP address to control when and which video conference participant speaks in the video conference.

15. A data structure embedded in a computer-readable medium comprising:
a group identifier field for containing data identifying a group of internet protocol television (IPTV) network video conference participants;
a video conference data address field for containing data identifying an internet protocol (IP) address for video conference data for delivery of the video conference data to video conference participants' STBs over a single IPTV video conference channel in the IPTV system, wherein each of the plurality of groups of STBs receives a different one of a plurality of video conferences data over the single video conference channel; and
a STB identifier field for containing data identifying the STBs associated with the group of video conference participants for mapping the single IPTV video conference channel to the video conference data address field and the STBs.

16. The data structure of claim 15, further comprising:
a channel identifier field for containing data identifying the single IPTV video conference channel in an IPTV network for distributing the video conference data to the video conference participants' STBs.

17. A set of application program interfaces embodied on a computer readable medium for execution on a computer in conjunction with an application program that distributes video conference internet protocol (IP) video data over a single IPTV video conference channel to a group of video participants' STBs IP addresses, the set of application program interfaces comprising:
a first interface that receives a group identifier IP data identifying a first group of video conference participants' STBs IP addresses;
a second interface that receives IP data representing a first video conference data IP address identifying an IP address for the first video conference IP data for delivery of the first video conference IP data to the first video conference participants' STBs IP addresses over the single IPTV video conference channel; and
a third interface that receives STB identifier IP data for identifying a plurality of STB identifiers associated with the first group of video conference participants' STBs for mapping the IPTV channel to the first video conference data IP address for delivery of the first video conference data to the first group of video conference participants' STBs IP addresses, wherein each of the plurality of groups of STBs receives a different one of a plurality of video conferences data over the single video conference channel.

18. The set of application program interfaces of claim 17, further comprising:
a fourth interface that receives a channel identifier IP data identifying the channel in the IPTV network for distributing first video conference data to the first group of video conference participants' STBs IP addresses.

19. A computerized method for distributing video conference data in an IPTV system, comprising:

sending from a first client device to a server, internet protocol (IP) data indicating a first list designating a first group of video conference participants' set top boxes (STBs) IP addresses; and sending from the client device to the server, a first video conference IP data, the first video conference IP data to be sent from the server over a single IPTV conference channel in the IPTV system to first group of video conference participants' STBs IP addresses, wherein each of a plurality of groups of STBs receives a different one of a plurality of video conferences data over a single video conference channel.

20. The method of claim 19, further comprising:

sending from a second client device to a server, second video conference IP data to a second group of video conference participants' STBs IP addresses to the server; and sending a second conference video data to the server, the second video conference data to be sent from the server to the second group of video conference IP participants' STBs IP addresses over the single video conference channel.

21. The method of claim 20, wherein the first and second client devices are the same client device.

22. A graphical user interface (GUI) embodied on a computer readable medium for execution on a computer in conjunction with an application program that distributes video conference data over a single IPTV video conference channel to a group of video conference participants' STBs, the GUI comprising:

a first interface that receives a first group identifier internet protocol (IP) data identifying one of a plurality of groups of video conference participants' STBs IP addresses;

a second interface that receives IP data representing a first video conference IP address identifying an address for delivery of the first video conference IP data to the first group of video conference participants' STBs IP addresses over the single IPTV video conference channel; and a third interface that maps the IPTV video conference channel to the first video conference address for delivery of the first video conference IP data to the first group video conference participants' STB over the single IPTV video conference channel, wherein each of a plurality of groups of STBs receives a different one of a plurality of video conferences data over a single video conference channel.

23. The GUI of claim 22, further comprising:

a fourth interface that receives IP data representing a second video conference internet protocol (IP) address identifying an address for delivery of the second video conference data to the second group of video conference participants' STBs IP addresses over the IPTV channel; and a fifth interface that that maps the video conference channel to the second video conference address for delivery of the second video conference IP data to the second group of video conference participants' STBs IP addresses.

* * * * *